SMITH & BROWN.
Rotary Churn.

No. 21,374. Patented Aug. 31, 1858.

UNITED STATES PATENT OFFICE.

JOHN F. SMITH, OF GALEN, AND WIGHTMAN BROWN, OF ROSE, NEW YORK.

CHURN.

Specification of Letters Patent No. 21,374, dated August 31, 1858.

*To all whom it may concern:*

Be it known that we, JOHN F. SMITH, of Galen, in the county of Wayne and State of New York, and WIGHTMAN BROWN, of Rose, in the county and State aforesaid, have invented a new and Improved Mode of Constructing Churns; and we do hereby declare that the following is a full and exact description of the construction and operation thereof, reference being had to the accompanying drawings, making part of this specification, and to the letters of reference marked thereon.

Figure 1:
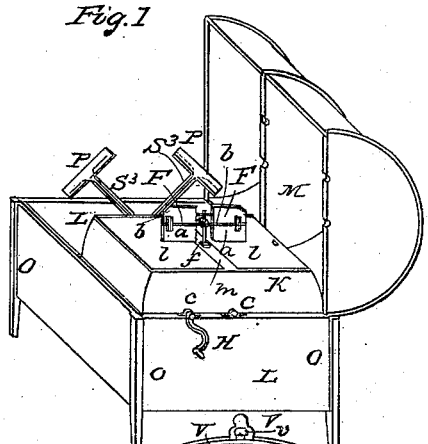
Figure 2:
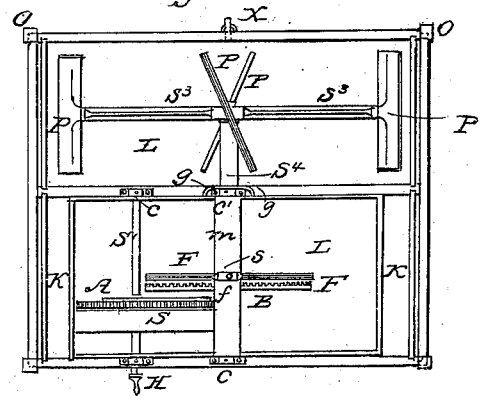
Figure 3:
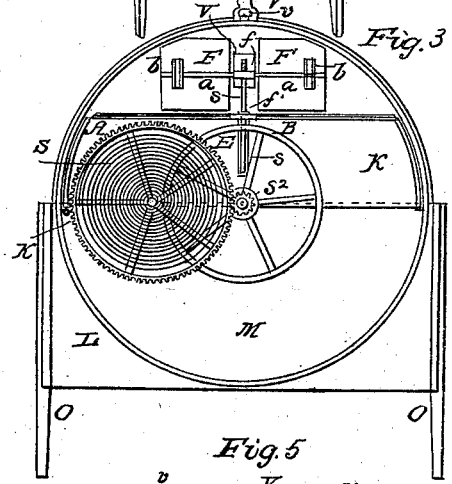
Figure 4:
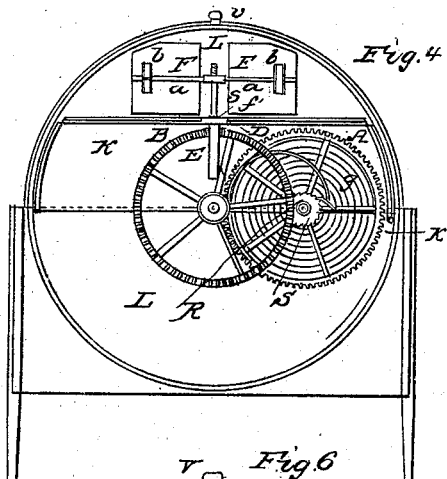
Figure 5:
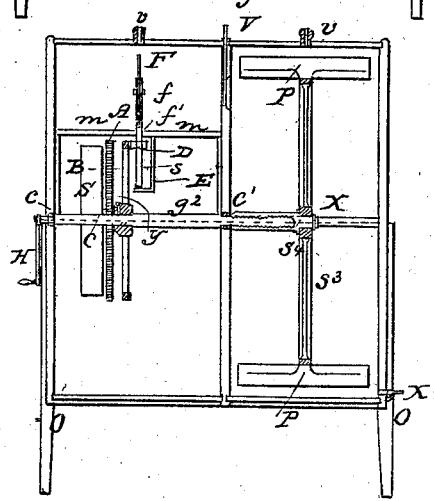
Figure 6:
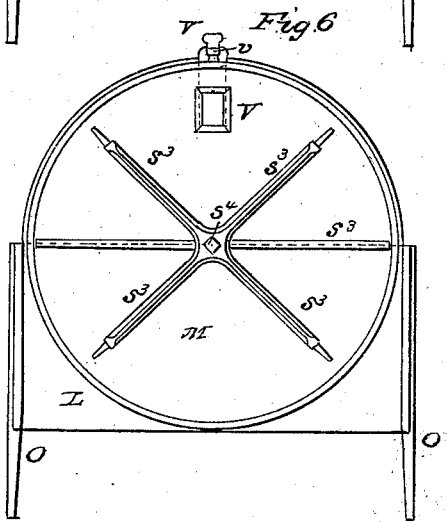

Figure 1, is a perspective view, Fig. 2, is a plan view, Fig. 3, is a sectional elevation of the driving parts in front, Fig. 4, is a sectional elevation of the driving parts in rear, Fig. 5, is a horizontal section, Fig. 6, is a sectional elevation of the milk chamber.

The same letters refer to like parts in each of the figures.

Our invention consists of a box or frame containing a cylindrical case, divided by a central vertical partition into two chambers of nearly equal capacity. In one of these we arrange the clock work or machinery for operating the churn; the other constitutes the milk chamber, and contains the beaters. The churn being automatic the driving machinery is placed in a secondary or interior case K, which is provided with sliding covers $l\ l$ which close it tightly while in operation, and prevent the oil or odor of the frictional parts from reaching and tainting the butter.

The driving parts being common to all self-propelling machines we will briefly describe them, for the benefit of those skilled in the art who may make or use our invention, and pass to the parts more essential for their novelty.

The shaft $S^1$, carries the driving wheel A, and ratchet B, with catch and spring $r$, $t$, and to it the coiled mainspring S, is attached at one end, the other being secured to the box at $k$. When wound up by the crank H, driving wheel A, gives motion to the pinion C, on shaft $S^2$, which carries the large beveled wheel B. This drives the bevel pinion B, on vertical shaft S, which extends through the interior case and carries the vane or fly F. The shaft $S^2$, lies in the axis of the cylinder and passes through the partition M, into the milk chamber. Upon this the wooden shaft $S^4$, carrying the beater arms $S^3$, is screwed, covering the end of the metal shaft as far as it lies in the milk chamber, to prevent the milk being contaminated by contact with the metal.

At the ends of the arms are the beaters P, consisting of four or more thin pieces of wood, set obliquely to the axis $S^4$, and with the angles of each alternate one opposed to the direction of the others, as seen in Fig. 2. Their sides are gradually rounded or beveled to a blunt edge, as are also the arms $S^3$, to prevent direct percussion, and allow them to pass into and through the milk more gradually, creating friction and agitation without too great commotion. The oblique position of the beaters serves this purpose, and also another and important one, that of breaking and commingling the currents formed by their passage through the liquid. Thus the passage of one beater gives a current directed to one side of the chamber, and the following one, having an opposing angle, directs the current to the opposite side. These counter currents thus produced are crossing the track of each other constantly at about the axis of the beater shaft, and the operation on the milk is very effective in producing butter.

The length of the main-spring is such that when once wound up it will run for a sufficient length of time to produce butter from the milk. The vane F, serves at once as a regulator of the motion of the beater, as well as a means of refrigerating and supplying fresh air to the milk chamber. As a regulator the wings, when vertical, present a large surface to the resistance of the air, thereby retarding the motion given by the spring S. To adjust this retarding power the wings are movable on their arms, $a$, being held in position by a small spring $b$, which is secured at each end in the wing, and presses on the arm so as to cause considerable friction, and thereby hold the wing at any desired angle to the arm. Thus the wings can be turned to a horizontal position so as to offer scarcely any resistance to the atmosphere, or more or less oblique as may be required. This means of regulation is extremely simple, and as the speed of rotation is liable to vary with the consistency of the milk or cream, as well as from the quantity churned is highly necessary. The condition of the milk at different temperatures is such also as to require different degrees of agitation to obtain butter, and an experienced person, knowing this requirement, can readily adjust the machinery to it.

The rapid motion of the vane or fans keeps a constant circulation of air around it, as well as through the ventilating orifice $v$ above it. A large opening V, in the partition M, allows the current of air set in motion by the vane to pass freely into the milk chamber. Another ventilating aperture $v$ allows the escape of air from the milk-chamber, and the effect is that the air is drawn in through the aperture above the fans, driven thence through the partition into the milk chamber, and out of the other ventilating orifice, keeping up a constant refrigerating action.

The action is thorough both as regards keeping the milk at a low temperature, and supplying fresh air to it during the process. A slide in the opening V, can be moved to partially or entirely close it by means of a handle on the top of the case.

The beater arms and shaft $S^4$, can be readily taken off, and removed when the process of churning is complete. The action of the oblique beaters is usefully exemplified, in collecting the butter as it forms, which it does in the center of the milk chamber, the particles moving in the counter current, uniting at that point.

We do not claim the invention of an automatic churn, but

What we claim as new and desire to secure by Letters Patent is—

The combination and arrangement of the cylinder divided into two chambers, for the purposes described, by the partition M, the close interior case K, adjustable vane blower and regulator, F, refrigerating passage V, and ventilators $v$ $v$ operating conjointly as and for the purpose specified.

J. F. SMITH.
   WIGHTMAN BROWN.

Witnesses:
 I. Fraser,
 S. J. Allis.